UNITED STATES PATENT OFFICE.

WILLIAM N. BLAKEMAN, JR., OF NEW YORK, N. Y.

OIL AND COMPOUND THEREOF.

989,227. Specification of Letters Patent. Patented Apr. 11, 1911.

No Drawing. Application filed August 13, 1910. Serial No. 577,098.

*To all whom it may concern:*

Be it known that I, WILLIAM N. BLAKEMAN, Jr., a citizen of the United States, and resident of the borough of Manhattan, in the city, county, and State of New York, have invented certain new and useful Improvements in Oils and Compounds Thereof, which invention is fully set forth in the following specification.

The object of this invention is to treat oils and fats in such a manner that their field of usefulness will be greatly broadened, and that, when properly compounded, they may be used for purposes in the arts for which they are not now adapted, namely: to fix and bind the vehicle, sometimes called the bond, in transparent, opalescent, and opaque glacé films; as a magma for comminuted vegetable, metallic, and mineral matter, in linoleum, oil-cloth, roofing paving, and artificial lumber manufacture; as a mastic for fatty cements and putty; and as a general, very stable, agglutinant.

The invention consists in combining with an oil or fat, or a derivative of an oil or fat, a hydrocarbon chlorid, with or without the addition of amorphous or comminuted matter; and by the term hydrocarbon chlorid, as used in this specification and in the claims, I intend to include not only chlorinated hydrocarbons, but also all chlorinated derivatives of hydrocarbons.

Any of the drying oils, the non-drying oils, the rosin oils, or their derivatives, may be treated by my invention. The oils preferably used are linseed, tung, cotton, sunflower, corn and menhaden, and their derivatives.

For the formation of the hydrocarbon chlorid, the hydrocarbons which are adapted for use in my process have been classified in general as the paraffins, the olefins and the asphaltic. They are also designated in a series according to atomicity, namely, $C_nH_{2n+2}$ for the paraffins, $C_nH_{2n}$ for the olefins, and $C_nH_{2n-2}$, $C_nH_{2n-4}$, etc., for the asphaltic. While a few of these hydrocarbons can be formed synthetically, their most abundant source is from the destructive distillation of organic matter as coal and the petroleums. From whatever source derived, it will be found economical in my process to use those produced on a commercial scale. Of the segregated hydrocarbons, I prefer methylene, $CH_4$, ethylene, $C_2H_4$, benzene, $C_6H_6$, naphthalene $C_{10}H_8$ representing the series $C_nH_{2n-12}$; and anthracene $C_{14}H_{10}$ representing the series $C_nH_{2n-18}$, this last being the highest atomic molecule that has been segregated for commerce and the arts. Of the aggregated hydrocarbons the many gravities of crude petroleum and their natural indurations, ozocerite and asphaltum; the distillates of petroleum and coal, including the by-products variously designated amorphous and crystalline paraffin, tailing wax, retort foots, still ends, coal-tar and the like; may all be used. Chlorin combines with all of these hydrocarbons, forming addition and substitution products, and while some of them, especially the higher atomic paraffins are refractory and indifferent to chlorin, yet by the aid of heat and light and a persistent attack, they will yield to combination. The chlorination can be carried on until the entire hydrogen has been replaced by chlorin, and in this last reaction the resulting compound becomes a chlorid of carbon, and may be designated as a perchlorid of carbon of the series to which it belongs. Both the addition and substitution derivatives can be used, either singly or in combination, in carrying out my invention. The higher atomic weights of the segregated hydrocarbons, such as naphthalene, anthracene and the like, and also the aggregated hydrocarbons, may be chlorinated in bulk, or mass, and used in this condition for many purposes in my invention, without the expense of isolating the digital, or separable, chlorids contained in the mass.

In this specification, and in the claims, where a digital addition chlorid of a segregated hydrocarbon is used, it will be so designated, thus, naphthalene tetrachlorid, addition, meaning $C_{10}H_8Cl_4$; benzene hexchlorid, addition, meaning $C_6H_6Cl_6$. In all other instances where a digital chlorid of a segregated hydrocarbon is used, a substitution product is intended and will be designated perchlorid for the highest chlorid in the series to which it belongs, and the other digital chlorids, mono, di, tri, tetra and so on, thus: naphthalene perchlorid, or octochlorid of carbon of naphthalene series, meaning $C_{10}Cl_8$; benzene perchlorid, or hexachlorid of carbon of benzene series, meaning $C_6Cl_6$; naphthalene tetrachlorid, $C_{10}H_4Cl_4$; anthracene dichlorid, meaning $C_{14}H_8Cl_2$. Hydrocarbons of the higher atomic molecule, either segregated or aggregated, and chlorinated in mass will be designated naphthalene chlorid, anthracene chlorid, paraffin chlorid, and tailing wax chlorid.

Of the segregated hydrocarbon chlorids, the perchlorid of methylene, the perchlorid of ethylene, the chlorids of benzene, the tetrachlorid of naphthalene, and the dichlorid and perchlorid of anthracene will be found very effective in my process. Of the hydrocarbons chlorinated in mass, I prefer naphthalene chlorid, the paraffin chlorids and tailing wax chlorids, the paraffins being now fractioned for commercial purposes according to their melting point, ranging from about 105° Fahr., for the petroleum butters, petroleum jellies and petrolatums, up to about 165° Fahr., for the harder crystalline waxes.

Owing to the great abundance of naphthalene, the paraffins, and tailing wax, in commerce, they are well adapted for economic use in my process. Naphthalene is attacked with energy by chlorin, and the chlorination may be continued until a light straw color is shown, with an increase in gravity, and a percentage of combined chlorin of about 50 to 53 per cent. and may be both an addition and substitution product, or chlorid. The chlorination may be pressed further by the use of a carrier, such as iron or antimony, until the resulting naphthalene chlorid is of a reddish straw color with a further increase of gravity and showing combined chlorin of about 70 per cent., indicating both an addition and substitution product. The use of a carrier intensifies the reaction, and the compound increasingly carbonizes the farther the process is pushed, but at the close of the operation, a simple distillation brings off the hydrocarbon chlorid free.

An amorphous paraffin or petrolatum, of about 29 or 30 sp. gr. of Baumé scale and 105° Fahr., m. p., may be chlorinated by a continuous run of 16 hours, when a satisfactory molecular chlorination throughout the mass will be effected. A white paraffin wax of 120°-125° Fahr., m. p., may be chlorinated by a continuous run of about 18 hours, a satisfactory molecular chlorination through the mass being effected. White paraffin wax of about 160°-165° Fahr., m. p., may be chlorinated by a continuous run of from 20 to 22 hours. Tailing wax, having a great affinity for chlorin, may be chlorinated by a run of 2 or 3 hours. The various gravities of neutral oil may be chlorinated to a dark vinegar color by a run of one hour. All chlorin disengaged, or hydrochloric acid discharged, can be easily recovered over water or otherwise and will be an economic factor in my process.

Having formed a chlorinated hydrocarbon, or a chlorinated derivative of a hydrocarbon, as above described, I incorporate it with an oil or fat, or a derivative of an oil or fat. The number and proportions of the ingredients should be regulated according to their character and properties, and the purpose for which the resulting compound is to be used; and while, as hereinbefore stated, any of the oils or fats or their derivatives may be used either singly or in combination, I prefer, in most instances, to use in the compound a percentage of tung oil. Tung oil has a great affinity for chlorin and the chlorids, and a compound of tung oil and hydrocarbon chlorid may be used as a basis for drying and indurating all the oils and fats in transparent and opaque films.

The oils and fats used in combination with the hydrocarbon chlorids, may be hydrated, rancidified, oxidized, or chlorinated, one or all, at any stage of the process, and by any suitable method. The chlorination, for example, may be effected by charging them with chlorin until the reaction is satisfactory as indicated by a slight precipitation or darkening of color and a marked increase in specific gravity. The oxidation, may be effected in any desired way, and under this term I mean to include the elaidinizing of the oils which may be effected by treating them with the oxids of nitrogen, such as nitrous acid anhydrid and the trioxid of nitrogen, the action producing an analogous effect to oxidation. It may also be desirable to reinforce and fortify oils and fats which are deficient in body, gravity, and viscosity, and this may be accomplished by incorporating the chlorids of the higher atomic hydrocarbons, from five to ten per cent. being generally sufficient for this purpose. An additional chlorid effect may also be produced in the compound by adding a fatty chlorid thereto, such as linseed oil chlorid, tung oil chlorid; linseed oil stearin chlorid, tung oil stearin chlorid, or cotton oil stearin chlorid.

The selection of the hydrocarbon chlorid to be used, may be easily determined by practice. The solid, laminated, and crystalline hydrocarbons, when chlorinated will give the best effects for glacé films, either transparent or opaque. The semi-fluid and flowing hydrocarbons, when chlorinated, may not only be used for the same purposes, but they will also act as very economical and superior substitutes for all present diluents, attenuants, reducers, and extenders, as they will form chemical combinations, with the oils.

The hydrocarbon chlorids, in general, unite and combine with each other at common temperatures or by the aid of heat and light, but I have discovered that they will unite and combine not only with oils and fats as above described, but also with fatty and metallic chlorids, fatty and metallic sulfids, and metallic oxids, sulfites, sulfates and carbonates. I have further discovered that the weathering elements have very little effect upon these chlorid combinations, and thus, all oils and fats, solid and liquid, when properly combined with hydrocarbon chlorids, can be used with all neutral, amorphous, and comminuted matter to form very stable compounds in mass, layer and films. Comminuted and amorphous mineral matter, of the same, or within reasonable limits of the same, refractive index as the fatty solution of these hydrocarbon chlorids, such as silica, zinc, silicate, calcium silicate, obsidian and the like, may be used as practice shall dictate and will preserve the transparent effect. An amorphous solid substance, having a small variation from the same refractive index, will give an opalescent glacé effect; while the use of the denser pigments will give an opaque glacé effect. Lead sulfite, regarded as an unsaturated molecule, I have discovered will unite and combine with chlorids, and that its combinations with hydrocarbon chlorids take on the characteristics of a double salt and are permanent. The abundant white and ferruginous clays, especially when fired sufficiently to overcome plasticity; powdered and fibrous cellulose; powdered and fibrous minerals; and comminuted matter in general, may be aggregated into various forms with the oils and fats, and the hydrocarbon chlorids, as a general permanent bond and agglutinant. Common rosin or colophony and the cheaper resins, will unite and combine with the hydrocarbon chlorids, the higher atomic weights being especially valuable in giving brilliancy, resiliency and permanency. Some of the digital hydrocarbon chlorids, both addition and substitution products, with their modifications, such as naphthalene dichlorid and naphthalene tetrachlorid addition, alpha modification, being highly double refractive are especially adapted to this purpose of giving brilliancy.

Without confining myself to exact proportions, the following examples may be given of satisfactory compounds:

(1) 70 parts menhaden oil; 15 parts tung oil; 10 parts tailing wax chlorid; 5 parts perchlorid of ethylene.

(2)—84 parts menhaden oil; 6 parts naphthalene chlorid; 10 parts tung oil.

(3)—94 parts tung oil; 3 parts perchlorid ethylene; 3 parts tailing wax chlorid.

(4)—92 parts tung oil; 5 parts anthracene chlorid, 3 parts perchlorid ethylene.

(5)—75 parts linseed oil; 10 parts tung oil; 10 parts tailing wax chlorid; 5 parts perchlorid of ethylene.

All of the above, when properly mixed, and spread with a brush, will form transparent glacé films upon the surface upon which they are laid.

For the production of opaque glacé films, the following are examples of satisfactory compounds:

(6)—85 parts cotton or sunflower oil; 10 parts naphthalene chlorid; 5 parts tung oil; and 100 parts zinc oxid or 160 parts of zinc lead.

(7)—87 parts menhaden oil; 8 parts naphthalene chlorid; 5 parts tung oil; 160 parts zinc lead.

(8)—80 parts menhaden oil; 15 parts petrolatum chlorid; 5 parts tung oil; 100 parts zinc oxid.

(9)—92 parts menhaden oil; 5 parts naphthalene chlorid; 3 parts menhaden chlorid; 160 parts zinc lead.

(10)—85 parts linseed oil; 10 parts petrolatum chlorid; 5 parts tung oil, and 100 parts of zinc oxid or 160 parts of zinc lead.

It is to be understood that the usual amount of commercial liquid drier is to be added in the formation of all of the above compounds.

The proportions and number of ingredients given are merely illustrative of a wide range of proportions and ingredients which may be employed in practice and fall within the scope of my invention.

Agitation, pressure, heat and light, may be used when deemed advisable, and the actinic effect of the arc light will be found a good substitute for the sun's rays. In applying heat for chlorination, the well-known baths for controlling temperatures are recommended instead of the direct flame.

In the elimination of hydrochloric acid by heat or otherwise, if any trace should remain it can be neutralized by a small quantity of magnesia or alumina.

The chlorination of the hydrocarbons and especially of the higher atomic weights such as naphthalene, anthracene, paraffin, and tailing wax, seems to reduce greatly their inflammability and combustibility, in so much that they resist for some time the application of a direct flame. This and their indifference to the weathering elements are characteristics that are carried with marked effect into their combinations.

The effect produced by the hydrocarbon chlorid on the oil or fat is easily shown when the compound is spread as a film. An oil film carrying an unchlorinated liquid hydrocarbon will exhibit, during its drying and induration, a continued exudation of the hydrocarbon to the surface, which is readily detected by a gentle stroke of the finger; but an oil film carrying a liquid hydrocarbon chlorid will give no exudation and will dry and indurate into a smooth, homogeneous cuticle. This contrast is very marked with a mixture of a drying oil film accelerated by a commercial liquid drier. A film carrying the higher atomic semi-liquid and solid hydrocarbons is greatly retarded, and in some cases almost entirely prevented, from drying and indurating, while the chlorids of the same hydrocarbons accelerate the drying and indurating in a very marked degree, thus affording almost conclusive proof of a chemical union and furnishing a strong inference that these substances combine in an oxy-chloro-compound. Proper proportions must be used and, when so manipulated, the ultimate result will be a permanent surface repellent to the weathering elements,—a feature not attained in any system of oil films at present in use.

Having thus fully described my invention, I claim:—

1. A compound or mixture of an oil or fat, or a derivative thereof, and a hydrocarbon chlorid containing two or more atoms of carbon.

2. A compound or mixture of tung oil and a hydrocarbon chlorid.

3. A compound or mixture of tung oil; another oil or a fat or a derivative thereof; and a hydrocarbon chlorid.

4. A compound or mixture of an oil or fat, or a derivative thereof, and a chlorid of naphthalene.

5. A compound or mixture of tung oil and a chlorid of naphthalene.

6. A compound or mixture of tung oil; another oil or fat or a derivative thereof; and a chlorid of naphthalene.

7. A compound or mixture of an oil or fat; a hydrocarbon chlorid; and a reinforcing chlorid.

8. A compound or mixture of an oil or fat; a hydrocarbon chlorid; and a fatty chlorid.

9. A compound or mixture of an oil or fat, or a derivative thereof; a hydrocarbon chlorid containing two or more atoms of carbon; and an opaque substance.

10. A compound or mixture of an oil or fat; or a derivative thereof; a hydrocarbon chlorid containing two or more atoms of carbon; and a pigment.

11. A compound or mixture of tung oil; a hydrocarbon chlorid; and an opaque substance.

12. A compound or mixture of tung oil; another oil or fat; or a derivative thereof; a hydrocarbon chlorid; and an opaque substance.

13. A compound or mixture of tung oil; a hydrocarbon chlorid; and a pigment.

14. A compound or mixture of tung oil; another oil or fat, or a derivative thereof; a hydrocarbon chlorid; and a pigment.

15. A compound or mixture of an oil or fat; a hydrocarbon chlorid; a fatty chlorid; and an opaque substance.

16. A compound or mixture of an oil or fat; a hydrocarbon chlorid; and lead sulfite.

WM. N. BLAKEMAN, Jr.

Witnesses:
   FRANCIS P. REILLY,
   MABEL O. FAHNESTOCK.